(12) United States Patent
Yoshikawa

(10) Patent No.: US 8,787,489 B2
(45) Date of Patent: Jul. 22, 2014

(54) WIRELESS COMMUNICATION DEVICE

(75) Inventor: Yoshishige Yoshikawa, Shiga (JP)

(73) Assignee: Panasonic Corporation, Kadoma-shi, Osaka (JP)

( * ) Notice: Subject to any disclaimer, the term of this patent is extended or adjusted under 35 U.S.C. 154(b) by 70 days.

(21) Appl. No.: 13/390,884

(22) PCT Filed: Aug. 26, 2010

(86) PCT No.: PCT/JP2010/005259
§ 371 (c)(1),
(2), (4) Date: Feb. 16, 2012

(87) PCT Pub. No.: WO2011/052124
PCT Pub. Date: May 5, 2011

(65) Prior Publication Data
US 2012/0147878 A1    Jun. 14, 2012

(30) Foreign Application Priority Data

Oct. 28, 2009    (JP) .................................. 2009-247375

(51) Int. Cl.
*H04B 15/00* (2006.01)
*H04L 1/00* (2006.01)
*H04L 1/18* (2006.01)
*H04L 1/08* (2006.01)

(52) U.S. Cl.
CPC ............ *H04L 1/1854* (2013.01); *H04L 1/0083* (2013.01); *H04L 1/08* (2013.01); *H04L 1/0007* (2013.01)
USPC ....................................................... 375/285

(58) Field of Classification Search
USPC .................. 375/219, 285, 295, 316, 346, 350
See application file for complete search history.

(56) References Cited

U.S. PATENT DOCUMENTS

2002/0039888 A1    4/2002    Hama
2002/0141435 A1*  10/2002   Newberg et al. .............. 370/442

FOREIGN PATENT DOCUMENTS

| EP | 1253753 A2 | 10/2002 |
| EP | 1253753 A3 | 11/2003 |
| JP | 2002-111603 A | 4/2002 |
| JP | 2002-319946 A | 10/2002 |
| JP | 2002-323222 A | 11/2002 |
| JP | 2004-015581 A | 1/2004 |
| JP | 2007-158976 A | 6/2007 |
| JP | 2007-166162 A | 6/2007 |

OTHER PUBLICATIONS

International Search Report for International Application No. PCT/JP2010/005259, dated Nov. 22, 2010, 1 page.

* cited by examiner

*Primary Examiner* — Michael J Moore, Jr.
*Assistant Examiner* — Ajay Cattungal
(74) *Attorney, Agent, or Firm* — Brinks Gilson & Lione

(57) ABSTRACT

A wireless communication device includes a transmission data generator which segments transmission data into a plurality of subslots and then generates a plurality of slots each including a predetermined number of subslots from among the plurality of subslots, and a transmitter which transmits the plurality of slots generated by the transmission data generator. The time length $T_1$ of the subslots is equal to or smaller than an oscillator stopping time which is determined on the basis of a change in voltage of a commercial AC power supply.

6 Claims, 11 Drawing Sheets

WIRELESS COMMUNICATION DEVICE

This application is a 371 application of PCT/JP2010/005259 having an international filing date of Aug. 26, 2010, which claims priority to JP2009-247375 filed Oct. 28, 2009, the entire contents of which are incorporated herein by reference.

TECHNICAL FIELD

The present invention relates to a wireless communication device which performs wireless communication through electric waves. In particular, the present invention relates to a wireless communication device capable of preventing a communication distance from being reduced due to the influence of unwanted radiation from a microwave oven when communication is performed in an environment in which the microwave oven is in operation.

BACKGROUND ART

The magnetron of a microwave oven oscillates in the vicinity of a frequency of 2.45 GHz, and emits unwanted radiant waves to an ambient environment. For this reason, there is a problem in that the communication distance of a wireless communication device which performs wireless communication in that frequency band is extremely shortened due to the influence of unwanted radiation from the microwave oven, or the wireless communication device may not perform communication.

A wireless communication device for avoiding this problem has been proposed. The microwave oven operates with a commercial power supply (AC 100 V, 200 V, or the like), and the AC frequency of the commercial power supply is 50 Hz or 60 Hz. The voltage of the microwave oven periodically passes through the point of the voltage 0 V (zero cross point), and oscillation of the magnetron is temporarily stopped in the vicinity of the zero cross point. The wireless communication device of the related art detects this timing and performs wireless communication in synchronization with the zero cross point (for example, see PTLs 1 to 3).

However, the method of the related art has the following problems.

(1) When the wireless communication device is not connected to the commercial power supply, the zero cross point may not be detected by the wireless communication device to begin with.

(2) Even if the wireless communication device is connected to the commercial power supply, it is necessary to provide an additional circuit for detecting the zero cross point in the wireless communication device.

(3) If countermeasure communication (transmission aimed at the zero cross point) is performed, the effective transmission rate decreases. Accordingly, when the microwave oven is not in operation, it is preferable that countermeasure communication is not performed. However, in the method of the related art, since the operation state of the microwave oven may not be accurately recognized by the wireless communication device, countermeasure communication is constantly performed so as to remain unobstructed.

(4) When the microwave oven is in operation, even if countermeasure communication is not performed, communication may become successful depending on the conditions. However, in the method of the related art, countermeasure communication is performed without exception. The conditions include when the distance between wireless communication devices is short, the oscillation intensity of the magnetron is lowered by heat control of the microwave oven, when oscillation is temporarily stopped, and the like.

As described above, in the method of the related art, since communication is performed aimed at the timing of the zero cross point, there is a problem in that it is necessary to synchronize with the commercial power supply or it is necessary to accurately recognize the operation state of the microwave oven.

[PTL 1] Japanese Patent Unexamined Publication No. 2002-111603

[PTL 2] Japanese Patent Unexamined Publication No. 2002-319946

[PTL 3] Japanese Patent Unexamined Publication No. 2002-323222

SUMMARY OF THE INVENTION

In order to solve the above-described problems, the invention is to provide a wireless communication device which does not need to perform communication aimed at the timing of the zero cross point and does not need to synchronize with the commercial power supply or to accurately recognize the operation state of the microwave oven.

A wireless communication device of the invention includes a transmission data generator which segments transmission data into a plurality of subslots and then generates a plurality of slots each including a predetermined number of subslots from among the plurality of subslots, and a transmitter which transmits the plurality of slots generated by the transmission data generator. The time length T1 of each subslot is equal to or smaller than an oscillator stopping time which is determined on the basis of a change in voltage of a commercial AC power supply.

DETAILED DESCRIPTION OF THE PREFERRED EMBODIMENTS

Hereinafter, exemplary embodiments of the invention will be described with reference to the drawings. It should be noted that the exemplary embodiments are not intended to limit the invention.

First Exemplary Embodiment

Figure 1:
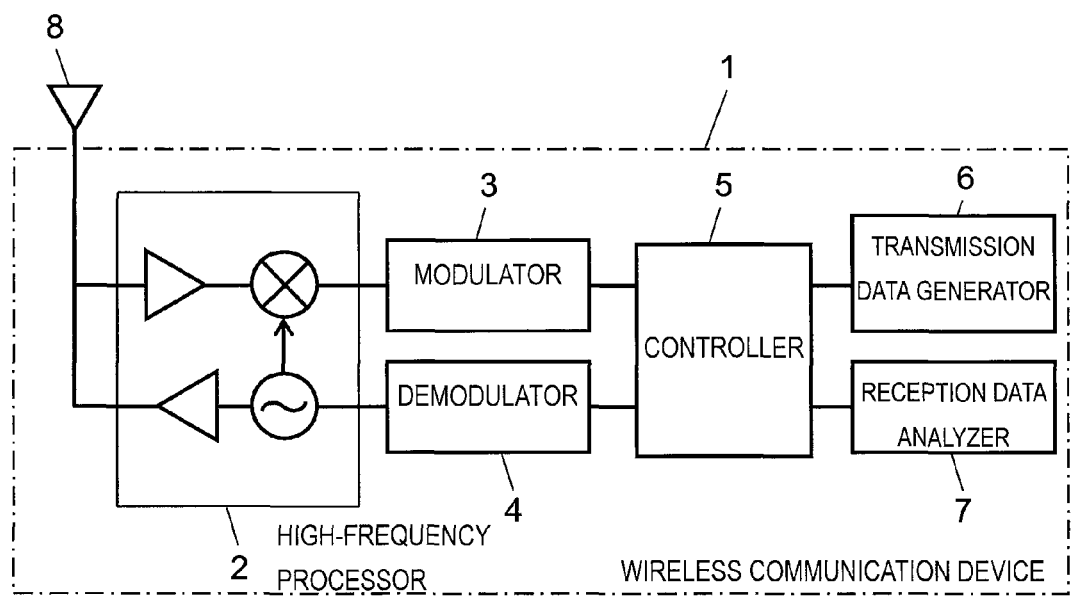
FIG. 1 is a block diagram showing the configuration of a wireless communication device in a first exemplary embodiment of the invention.

FIG. 1 is a block diagram showing the configuration of a wireless communication device in a first exemplary embodiment of the invention. Wireless communication device 1 includes high-frequency processor 2, modulator 3, demodulator 4, controller 5, transmission data generator 6, reception data analyzer 7, and antenna 8.

Wireless communication device 1 includes data transmission and reception functions. Wireless communication device 1 uses a radio frequency in a range of 2.4 to 2.5 GHz for communication, and can change a communication channel. The modulation scheme of wireless communication device 301 is an FSK scheme, the transmission output is 10 mW, and the data transmission rate is 250 kbps.

Although transmission data which is transmitted by wireless communication device 1 has a packet configuration as described below, transmission data is generated by transmission data generator 6. Controller 5 is constituted by a microcomputer, and controls modulator 3 on the basis of transmission data of packet generated by transmission data generator 6 to generate a modulated signal. The modulated signal is converted to a high-frequency signal by high-frequency processor 2 serving as a transmitter and transmitted from antenna 8.

Although a case has been described where controller 5 is constituted by a microcomputer, controller 5 may be constituted by an arbitrary digital logic circuit or an analog circuit. Transmission data generator 6 and reception data analyzer 7 may be constituted by microcomputers or arbitrary circuits.

The high-frequency signal received by antenna 8 is converted to a modulated signal by high-frequency processor 2 functioning as a receiver, demodulated by demodulator 4, and then analyzed by reception data analyzer 7. The operations of demodulator 4 and reception data analyzer 7 are controlled by controller 5.

Figure 2:
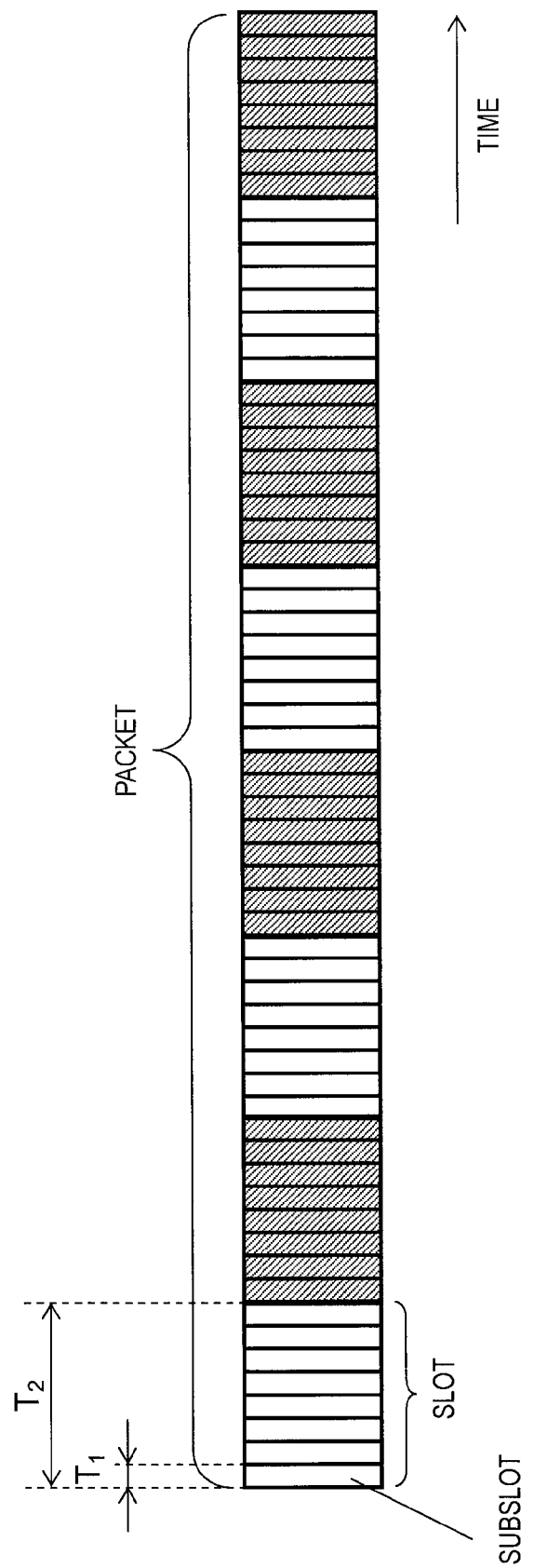
FIG. 2 is a diagram showing the configuration of a transmission packet in the first exemplary embodiment of the invention.

FIG. 2 is a diagram showing the configuration of a transmission packet which is generated by transmission data generator 6 in the first exemplary embodiment of the invention. Transmission data is segmented into eight pieces of data (N=8), each subslot is constituted by each piece of segmented data, and eight subslots are continued to constitute a slot. Eight slots are continued to constitute a packet. Wireless communication device 1 performs a transmission operation in terms of packets. N represents the number of segments when original transmission data included in one packet is segmented.

Figure 3:
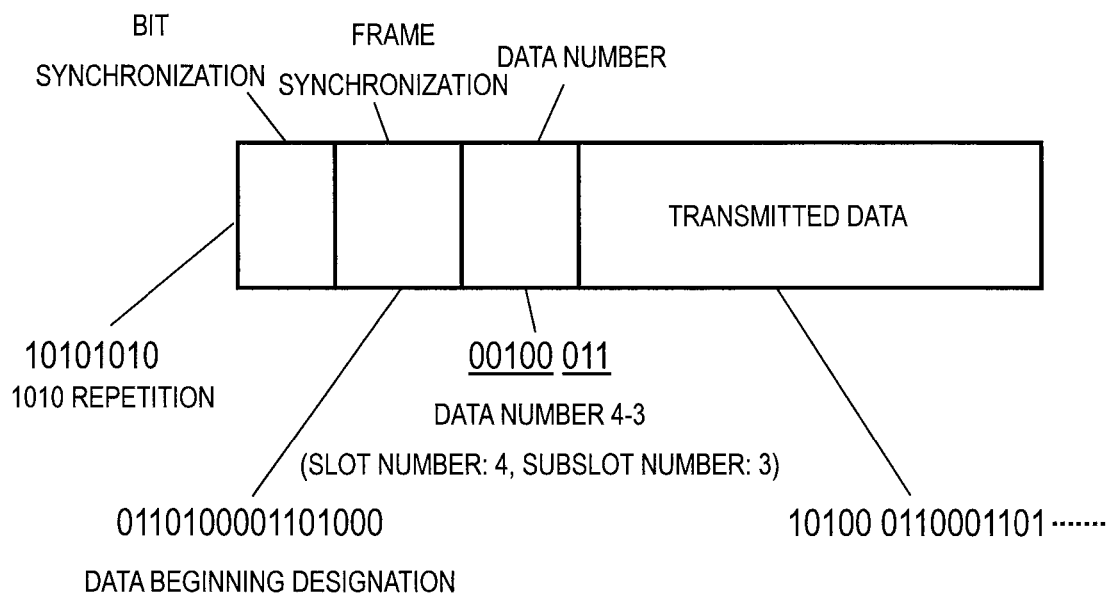
FIG. 3 is an explanatory view showing the configuration of subslots, which are elements constituting a slot, in the first exemplary embodiment of the invention.

FIG. 3 is an explanatory view showing the configuration of subslots, which are elements constituting a slot, in the first exemplary embodiment of the invention. Each subslot is constituted by bit synchronization data, frame synchronization data, a data number, and transmitted data from the head.

Bit synchronization data is data for detecting the data sampling timing on the reception side, and has a one-byte length.

Frame synchronization data is a pattern for specifying the beginning position of reception data, and has a two-byte length.

The data number is a number which represents the content of transmitted data, and data for detecting which subslot is received by a wireless communication device on the reception side. The data number has a one-byte length, and in the example shown in FIG. 3, represents the third subslot in the fourth slot. The data number has a different value for each subslot.

Transmitted data is one of eight segments of transmission data, and eight pieces of transmitted data can be collected to constitute one piece of transmission data.

As shown in FIG. 2, eight subslots are continued to constitute a slot. Eight slots are continued to constitute a packet. While transmission data (data in which eight pieces of transmitted data of the respective subslots are connected) in the respective slots is the same, the sequence of the subslots constituting each slot differs between the slots.

Figure 4:
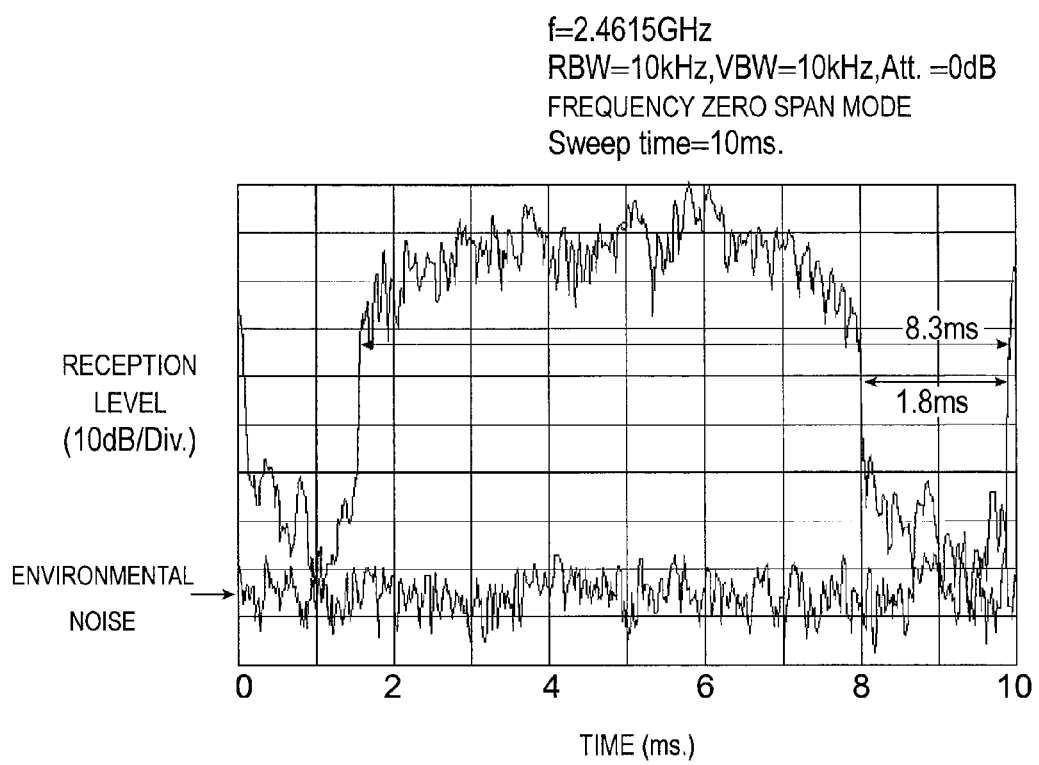
FIG. 4 is a diagram showing an example of a change in radiant wave intensity over time when a radiant wave having a frequency of 2.46 GHz which is radiated during operation of a microwave oven is measured using a frequency zero span mode of a spectrum analyzer provided in front of a low noise amplifier in the first exemplary embodiment of the invention.

FIG. 4 is a diagram showing an example of a change in radiant wave intensity over time when a radiant wave having a frequency of 2.46 GHz which is radiated during operation of a microwave oven is measured using a frequency zero span mode of a spectrum analyzer provided in front of a low noise amplifier in the first exemplary embodiment of the invention.

The microwave oven operates with a commercial power supply of 60 Hz (or 50 Hz), and in the case of an inverter type, inverter switching (switching frequency of about 20 kHz) is performed relative to a voltage waveform of 120 Hz obtained through full-wave rectification of 60 Hz. For this reason, radiant wave intensity passes through the zero cross point of the voltage for every 1/120 second (=8.33 msec).

The magnetron of the microwave oven stops oscillation in a time zone in the vicinity of the zero cross point. In the example of FIG. 4, it is understood that there is a stop time of 1.8 msec, and in this time zone, radiation from the microwave oven is substantially eliminated. A high-frequency signal transmitted from wireless communication device 1 for 1.8 msec is received by a wireless communication device on the reception side without being influenced by power radiation from the microwave oven.

Figure 5:
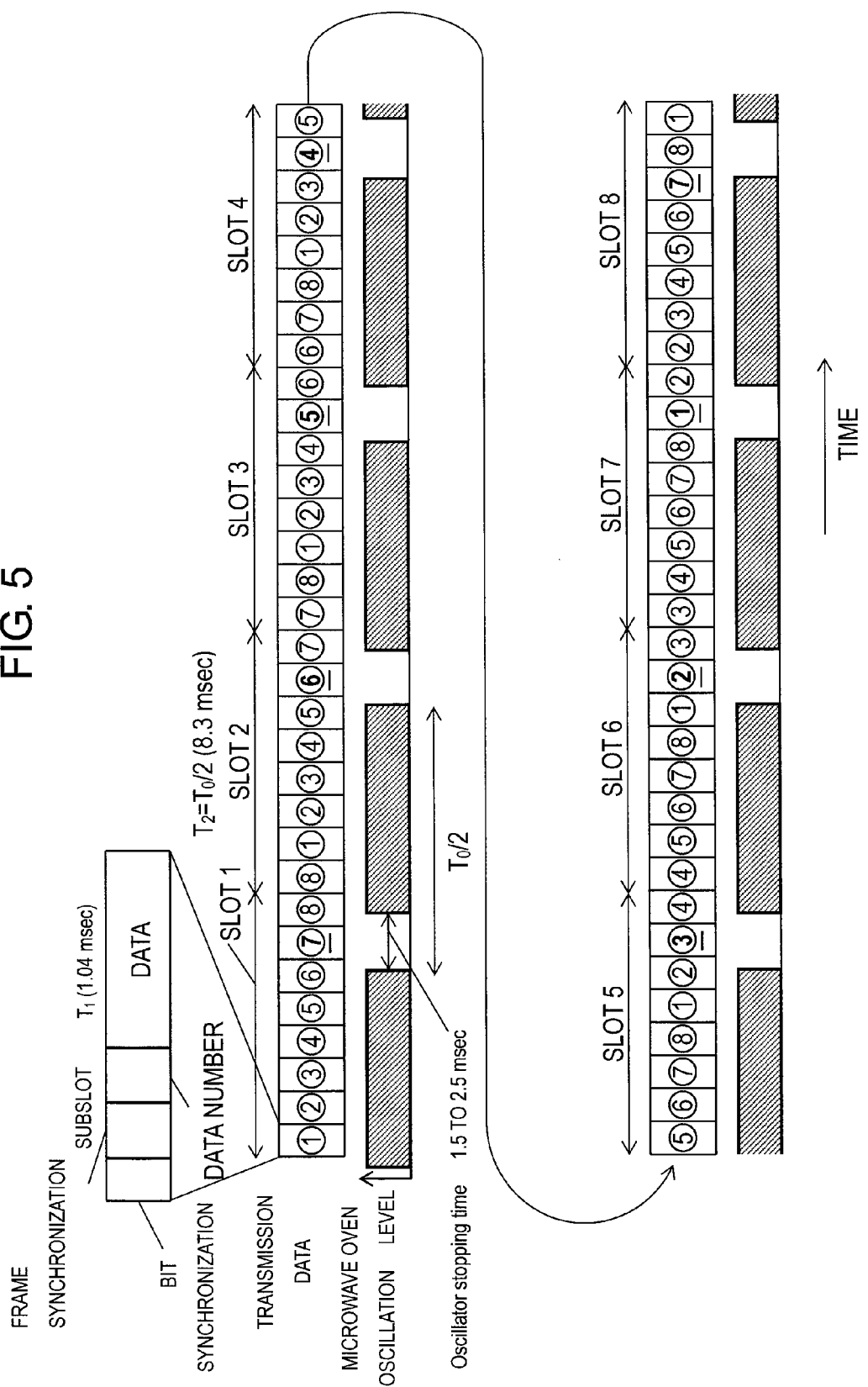
FIG. 5 is an explanatory view showing the configuration of a transmission packet in the first exemplary embodiment of the invention.

FIG. 5 is an explanatory view showing a transmission packet in the first exemplary embodiment of the invention. Description will be provided as to a case where the frequency of the commercial power supply is 60 Hz. The period of the commercial power supply is $T_0$=16.7 msec.

In the example of FIG. 5, transmission data is segmented into eight pieces of data (N=8), and the eight pieces of data are allocated to eight subslots (1) to (8) in each of slot 1 to slot 8. The time length of each subslot is $T_1$=1.04 msec, and corresponds to a case where the condition $T_1 \leq (T_0/2)/M$ is satisfied, and M=8. The eight subslots are connected to constitute one slot. The time length of each slot is $T_2$=8.33 msec, and the relationship $T_2=T_0/2$ is established. M represents the ratio of the time length $T_1$ of each subslot to the time $T_0/2$. The larger M, the shorter $T_1$.

In the example of FIG. 5, the first slot (slot 1) has subslots in a sequence of (1), (2), (3), . . . , and (8), and the next slot (slot 2) has subslots in a sequence of (8), (1), (2), and . . . (7). That is, the sequence of the subslots differs between the slots. The subsequent slots 3 to 8 are different in the sequence of the subslots.

FIG. 5 shows the time (microwave oven oscillation level) when the magnetron of the microwave oven oscillates. Since unwanted radiation is emitted in time zone when the magnetron oscillates, the wireless communication device on the reception side is affected by interference, such that bit errors may occur in reception data. However, there is the time zone when oscillation is stopped in the vicinity of the zero cross point of the commercial power supply. The stop time length, though slightly differs between microwave ovens, is 1.5 msec to 2.5 msec. Data received at this timing (oscillator stopping time zone) is not affected by unwanted radiation, and can be thus stably received without bit errors.

In the first slot (slot 1), the subslot (7) corresponds to the timing at which there is no influence of unwanted radiation. In the next slot (slot 2), the subslot (6) corresponds to the oscillator stopping time zone, and in the slots 3 to 8, the subslots (5), (4), (3), (2), (1), and (8) correspond to the oscillator stopping time zone. When all of the eight slots are received, the reception of all pieces of data of (1) to (8) is completed. Accordingly, even if the timing of the zero cross point is not recognized by wireless communication device 1, it becomes possible to perform communication of transmission data while avoiding the influence of the microwave oven.

As described above, according to this exemplary embodiment, data of a subslot which is transmitted at the timing in the vicinity of the zero cross point is sequentially replaced for each zero cross point, whereby all pieces of data can be received on the reception side. Therefore, it is possible to perform communication while avoiding the influence of unwanted radiation from the microwave oven.

In this exemplary embodiment, since identical data is repeatedly transmitted eight times, while the effective transmission rate is lowered to about ⅛, it is possible to reliably transmit the entire transmission data when one packet has been transmitted.

Figure 6:
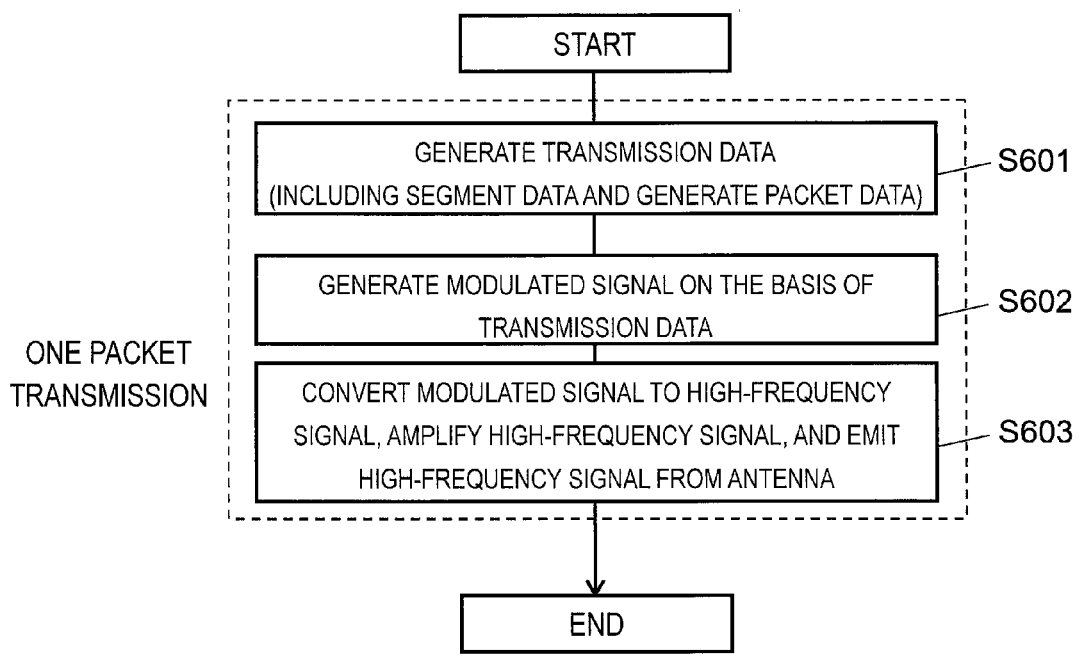
FIG. 6 is a flowchart showing a transmission operation of the wireless communication device in the first exemplary embodiment of the invention.

FIG. 6 is a flowchart showing a transmission operation of wireless communication device 1 in the first exemplary embodiment of the invention. FIG. 6 shows a transmission operation for one packet. First, transmission data is generated by transmission data generator 6 (Step S601). In this process, original transmission data is segmented into N pieces of data, N pieces of data are allocated to N subslots, and the N subslots are connected to constitute a slot. A plurality of slots are connected to constitute a packet.

Next, controller 5 performs control such that modulator 3 generates a modulated signal on the basis of transmission data generated by transmission data generator 6 (Step S602).

High-frequency processor 2 converts the modulated signal to a high-frequency signal, amplifies the high-frequency signal, and emits the high-frequency signal from antenna 8 (Step S603). Thus, the transmission operation ends.

Although the configuration of the subslot in which each subslot includes bit synchronization data and frame synchronization data has been described, bit synchronization data and frame synchronization data may be arranged in the first half or at an arbitrary location of the packet, and may not be included in the subslot. The subslot may not include bit synchronization data and frame synchronization data.

Although in this exemplary embodiment, a case has been described where transmission data is segmented into eight pieces of data (N=8), the invention is not limited to this example, and an arbitrary number of segments may be applied.

Although in this exemplary embodiment, one to two subslots are included in the oscillator stopping time zone of the microwave oven, the M value may be increased such that more subslots are included. Although N=8 and M=8, N and M do not need to be identical and may be different.

The next packet is arranged subsequent to one packet and transmitted, thereby transmitting large-volume data.

The data lengths of bit synchronization data, frame synchronization data, and the data number in the subslot may be arbitrarily selected.

Second Exemplary Embodiment

Figure 7:
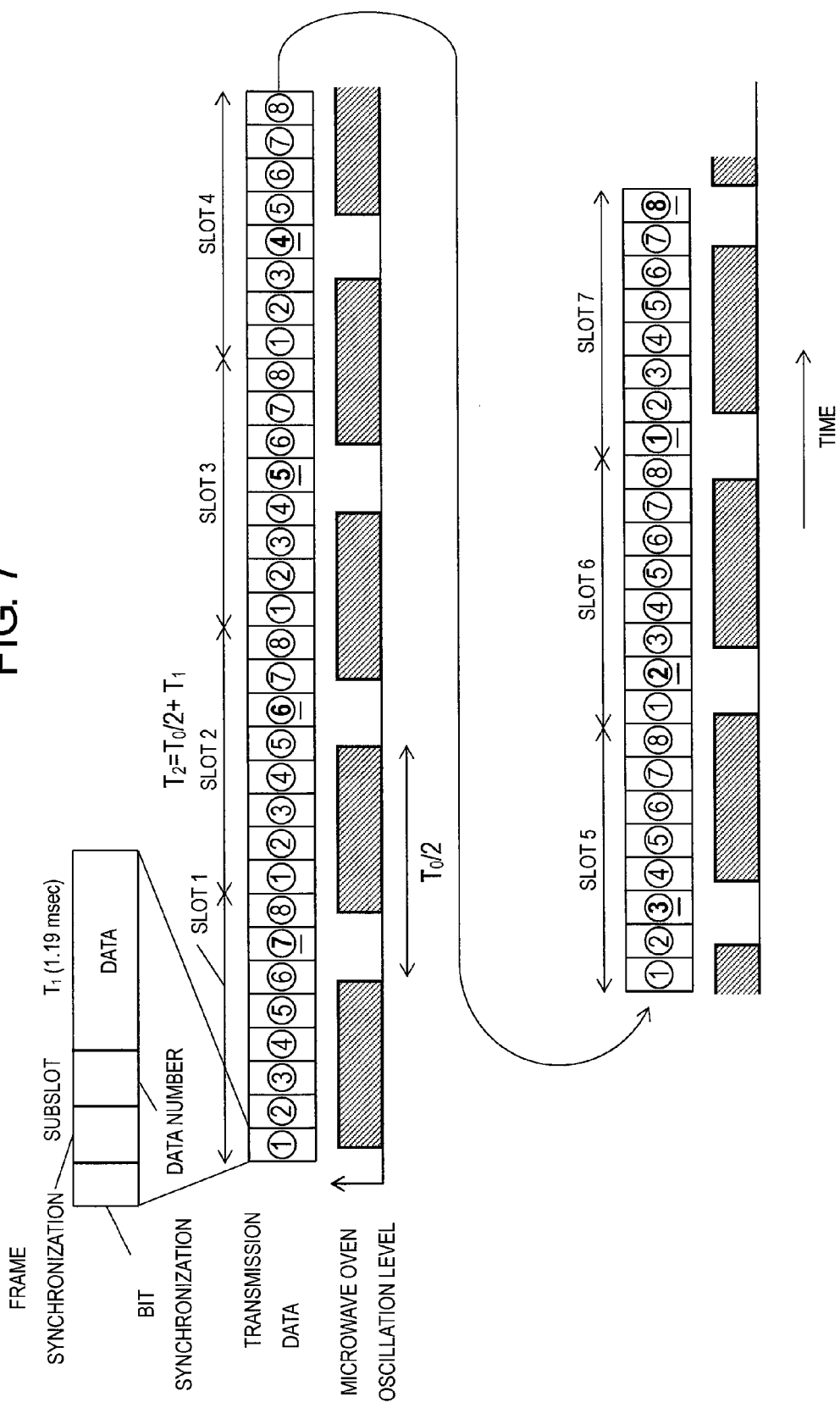
FIG. 7 is an explanatory view showing the configuration of a transmission packet of a wireless communication device in a second exemplary embodiment of the invention.

FIG. 7 is an explanatory view showing the configuration of a transmission packet of a wireless communication device in a second exemplary embodiment of the invention.

The configuration of wireless communication device 1 is the same as in the first exemplary embodiment, but a way to take the time length of the slot is different. In this exemplary embodiment, $T_2$ is set such that the relationship $T_2=T_0/2+T_1$ is established. M=7 and $T_1=(T_0/2)/7=1.19$ msec, thus $T_2=9.52$ msec. In this exemplary embodiment, the conditions: $T_1 \leq (T_0/2)/M$ and M=4 or more are satisfied.

In this exemplary embodiment, it is not necessary to change the sequence of the subslots in the slots 1 to 7. In all the slots, the subslots are arranged in a sequence of the subslots (1), (2), (3), (4), (5), (6), (7), and (8). Since $T_2$ is set such that the relationship $T_2=T_0/2+T_1$ is satisfied, it is possible to receive different subslots for each oscillator stopping time of the microwave oven. In FIG. 7, it is possible to receive the subslots in a sequence of the subslots (7), (6), (5), (4), (3), (2), (1), and (8) for each slot without obstruction.

With the configuration of the packet as described above, it becomes possible to perform communication while avoiding the influence of the microwave oven. In this exemplary embodiment, data of a subslot which is transmitted at the timing in the vicinity of the zero cross point is shifted and replaced for each zero cross point, whereby all pieces of data can be received on the reception side. Therefore, it is possible to perform communication while avoiding the influence of unwanted radiation from the microwave oven.

Although a flowchart of the transmission operation of this exemplary embodiment is the same as in FIG. 6, data which is generated by transmission data generator 6 is different from that in the first exemplary embodiment, and the time length $T_2$ of each slot in this exemplary embodiment is longer than that in the first exemplary embodiment. For this reason, it is possible to increase the size of each segmented data compared to the configuration of the first exemplary embodiment.

Third Exemplary Embodiment

Figure 8:
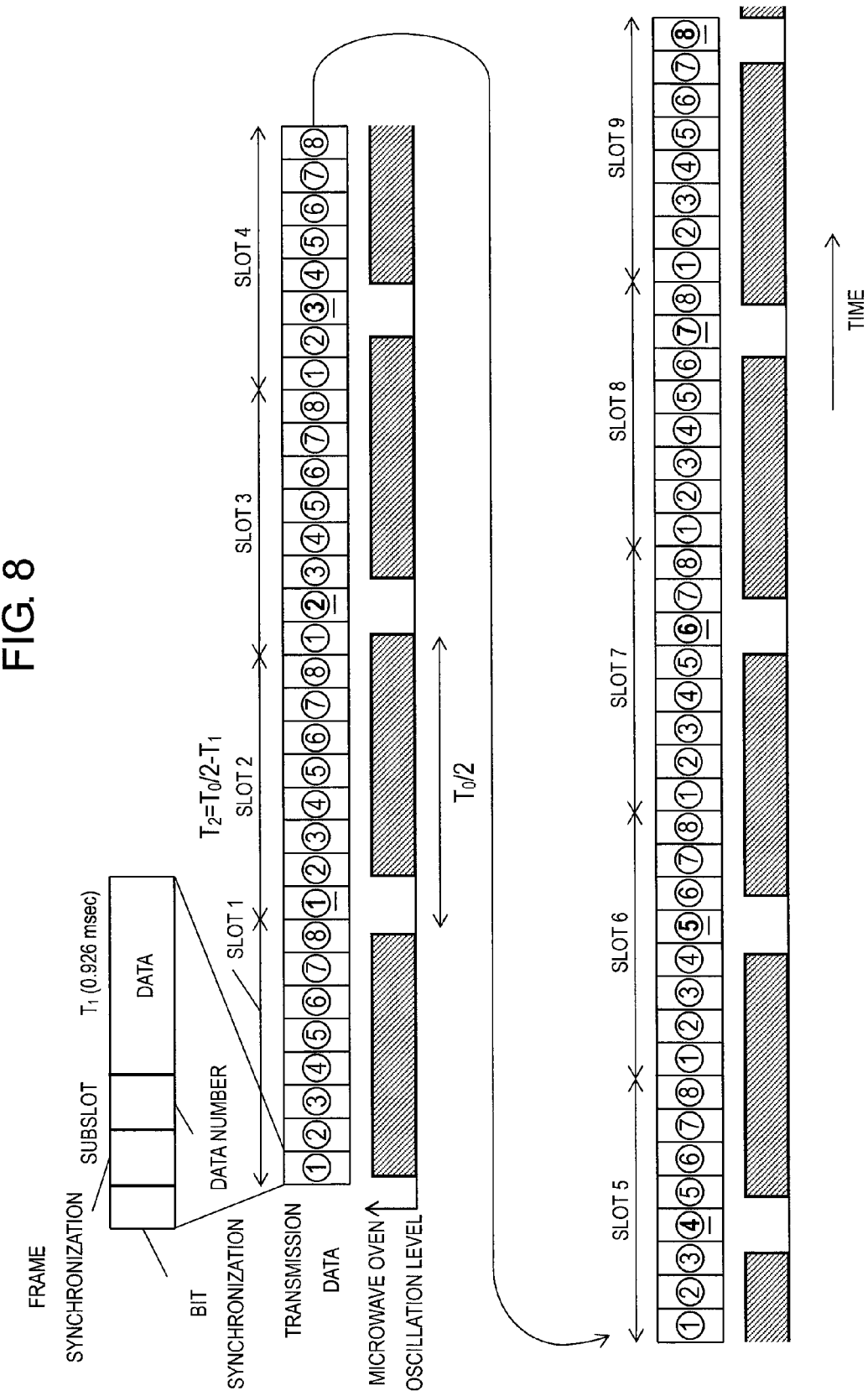
FIG. 8 is an explanatory view showing the configuration of a transmission packet of a wireless communication device in a third exemplary embodiment of the invention.

FIG. 8 is an explanatory view showing the configuration of a transmission packet of a wireless communication device in a third exemplary embodiment of the invention. The configuration of a wireless communication device in this exemplary embodiment is the same as in the first exemplary embodiment, but a way to take the time length of the slot is different.

In this exemplary embodiment, $T_2$ is set such that the relationship $T_2=T_0/2-T_1$ is satisfied. M=9 and $T_1=(T_0/2)/9=0.926$ msec, thus $T_2=7.40$ msec. In this exemplary embodiment, the conditions: $T_1 \leq (T_0/2)/M$ and M=8 or more are satisfied.

In this exemplary embodiment, as in the second exemplary embodiment, it is not necessary to change the sequence of the subslots in the slots 1 to 9. In all the slots, the subslots are arranged in a sequence of the subslots (1), (2), (3), (4), (5), (6), (7), and (8). In this exemplary embodiment, since $T_2$ is set such that the relationship $T_2=T_0/2-T_1$ is satisfied, it is possible to receive different subslots for each oscillation stop period of the microwave oven. In FIG. 8, in the slots 2 to 9, it is possible to receive the subslots in a sequence of the subslots (1), (2), (3), (4), (5), (6), (7), and (8).

In this exemplary embodiment, since $T_2$ is shorter than $T_0/2$, in order that all the eight subslots are received without obstruction, nine slots need to be provided. Accordingly, it becomes possible to perform communication while avoiding the influence of the microwave oven. In this exemplary embodiment, data of a subslot which is transmitted at the timing in the vicinity of the zero cross point is shifted and replaced for each zero cross point, whereby all pieces of data can be received on the reception side. Therefore, it is possible to perform communication while avoiding the influence of unwanted radiation from the microwave oven.

A flowchart of the transmission operation in the exemplary embodiment is the same as in FIG. 6.

Although in this exemplary embodiment, the number of slots included in one packet increases compared to the first exemplary embodiment and the second exemplary embodiment, each slot length is shortened, such that the time length of the packet is the same as in the first exemplary embodiment and the second exemplary embodiment. Therefore, the data transmission rate can be substantially equal.

Fourth Exemplary Embodiment

Figure 9:
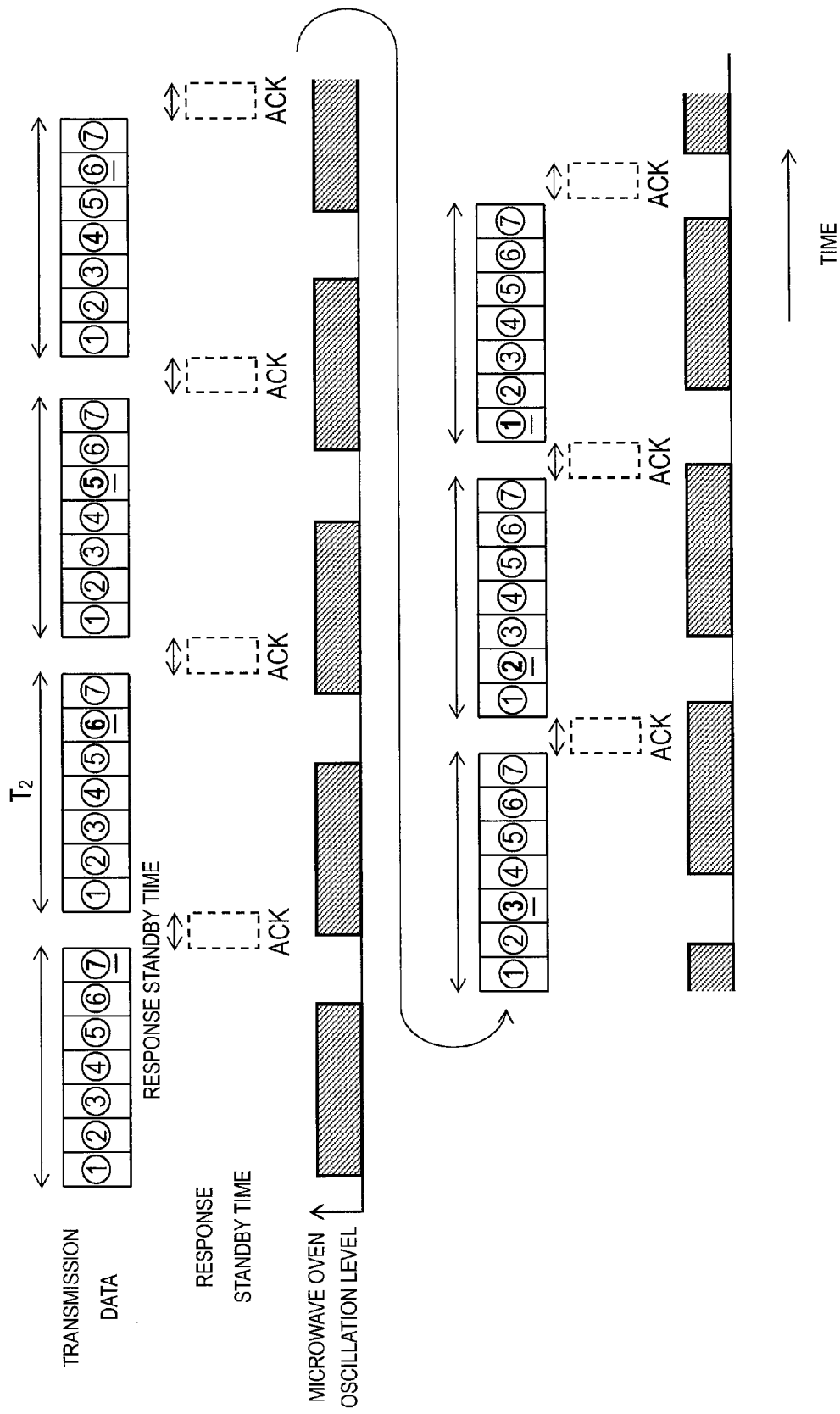
FIG. 9 is an explanatory view showing the configuration of a transmission packet of a wireless communication device in a fourth exemplary embodiment of the invention.

FIG. 9 is an explanatory view showing the configuration of a transmission packet of a wireless communication device in a fourth exemplary embodiment of the invention. The configuration of the wireless communication device in this exemplary embodiment is the same as in the first exemplary embodiment.

In this exemplary embodiment, a response standby time for stopping the transmission operation of wireless communication device 1 and receiving a response signal (ACK signal) from the wireless communication device on the other side is provided.

In this exemplary embodiment, transmission data is segmented into seven pieces of data (N=7). As shown in FIG. 9, after a slot having seven subslots has been transmitted, the response standby time for which transmission is stopped and a reception operation is performed is provided. A received signal is subjected to a demodulation process by demodulator 4 and analyzed by reception data analyzer 7.

Although the wireless communication device on the reception side is obstructed by unwanted radiation of the microwave oven, since there is no or less influence of obstruction depending on the conditions, transmitted data included in a slot may be received with no or little bit errors. A few errors are corrected by the wireless communication device on the reception side through an error correction coding process on transmission data, thereby ensuring successful reception.

In this case, since the entire transmission data can be received by receiving only one slot, it is not necessary to receive the subsequent slots. Accordingly, the wireless communication device on the reception side transmits a response packet (AKC signal) at the timing at which wireless communication device 1 is at the response standby time. It is assumed that the response packet includes information representing that reception is successful, a successful subslot number, or the like.

For example, the first response packet in FIG. 9 includes information representing that the reception of the subslot (7) is successful, the second response packet includes information representing that the reception of the subslots (7) and (6) is successful, and the third response packet includes information that the reception of the subslots (7), (6), and (5) is successful. In this way, the numbers of all the subslots which have been previously successful are recorded in the response packet. In the above-described case, since there are failed subslots, wireless communication device 1 continues to transmit the next slot.

As another example, when the first response packet includes information representing that the reception of the subslots (1) to (8) is successful, wireless communication device 1 can stop the transmission of the next slot and can complete the transmission of the packet.

Wireless communication device 1 can receive the response packet to determine that it is not necessary to transmit the next slot, can stop the transmission of the next slot, and can be transited to the transmission of the next packet (next transmission data).

Alternatively, since wireless communication device 1 can recognize the subslot number successfully transmitted from the response packet and can know failed subslots, it is thus possible to take measures to transmit failed subslots in line in a subsequent transmission slot. Accordingly, it is possible to increase the rate of reception success of failed subslots. It is therefore possible to reduce the number of slot transmissions to reduce the time until the transmission of the entire transmission data is completed.

According to this exemplary embodiment, when there is less influence of the microwave oven, since a response packet representing reception success is frequently transmitted from a transmitter-receiver on the reception side, it is possible to transmit the next packet (next transmission data) in turn, making it possible to increase the effective transmission rate. In this case, even if countermeasure communication of this exemplary embodiment is performed, it is possible to obtain a speed close to the transmission rate for normal communication where countermeasure communication is not performed.

In this way, when there is a large influence of the microwave oven, countermeasure communication is performed to repeatedly transmit the slots. When there is less influence, it becomes possible to perform an adaptive operation to stop countermeasure communication, thereby increasing the transmission rate.

Figure 10:
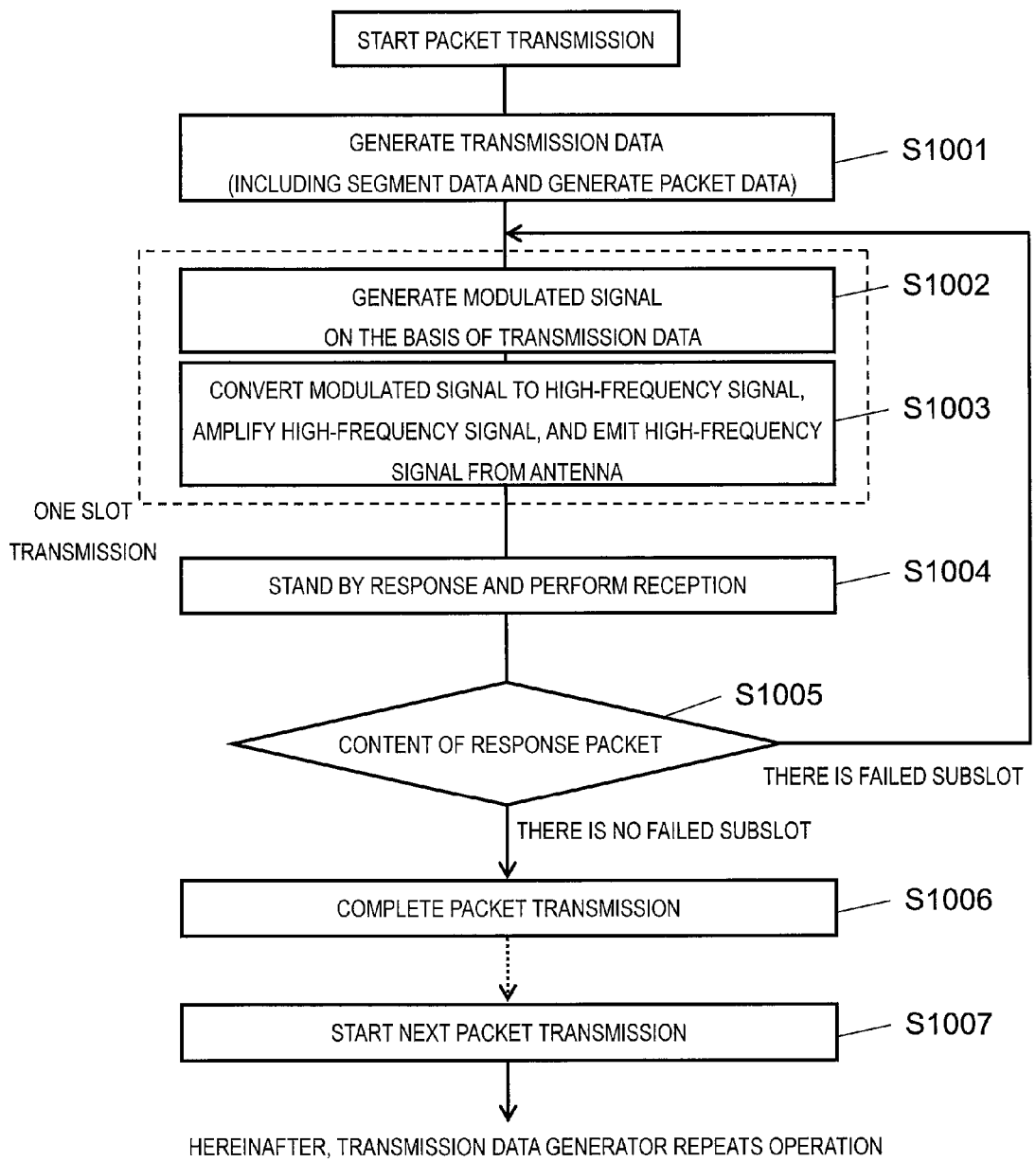
FIG. 10 is a flowchart showing a transmission operation of the wireless communication device in the fourth exemplary embodiment of the invention.

FIG. 10 is a flowchart showing the transmission operation of wireless communication device 1 in the fourth exemplary embodiment of the invention. First, transmission data shown in FIG. 9 is generated by transmission data generator 6 (Step S1001). Next, data transmission of one slot is performed. Controller 5 performs control such that modulator 3 generates a modulated signal on the basis of transmission data (Step S1002). High-frequency processor 2 converts the modulated signal to a high-frequency signal, amplifies the high-frequency signal, and emits the high-frequency signal from antenna 8 (Step S1003).

Next, wireless communication device 1 provides a response standby time after data transmission of one slot and performs a reception operation (Step S1004). At this time, if a response packet is received, reception data analyzer 6 analyzes the content of the response packet and determines the presence/absence of a reception-failed subslot (Step S1005).

When the analysis result shows that there is no reception-failed subslot, packet transmission ends (Step S1006).

When there is a reception-failed packet, the next slot is transmitted. At this time, the transmission packet may have the packet content defined in advance. Meanwhile, a slot having the contents of failed subslots determined from the response packet in line is transmitted, thereby reducing the number of slot transmissions.

When reception data analyzer 6 has confirmed from each response packet that the transmission of all subslots is successful, packet transmission ends (Step S1006). If the transmission of one packet ends, the transmission of the next packet starts (Step S1007). Subsequently, the same operation is repeated, thereby continuing data transmission.

According to this exemplary embodiment, since the time for receiving the response signal is provided each time a slot is transmitted, it is detected on the transmission side from the response packet that a wireless communication unit on the reception side can receive data with no bit errors or with less influence of bit errors, and the data content of a slot to be next transmitted is changed, thereby increasing the effective transmission rate.

Fifth Exemplary Embodiment

Figure 11:
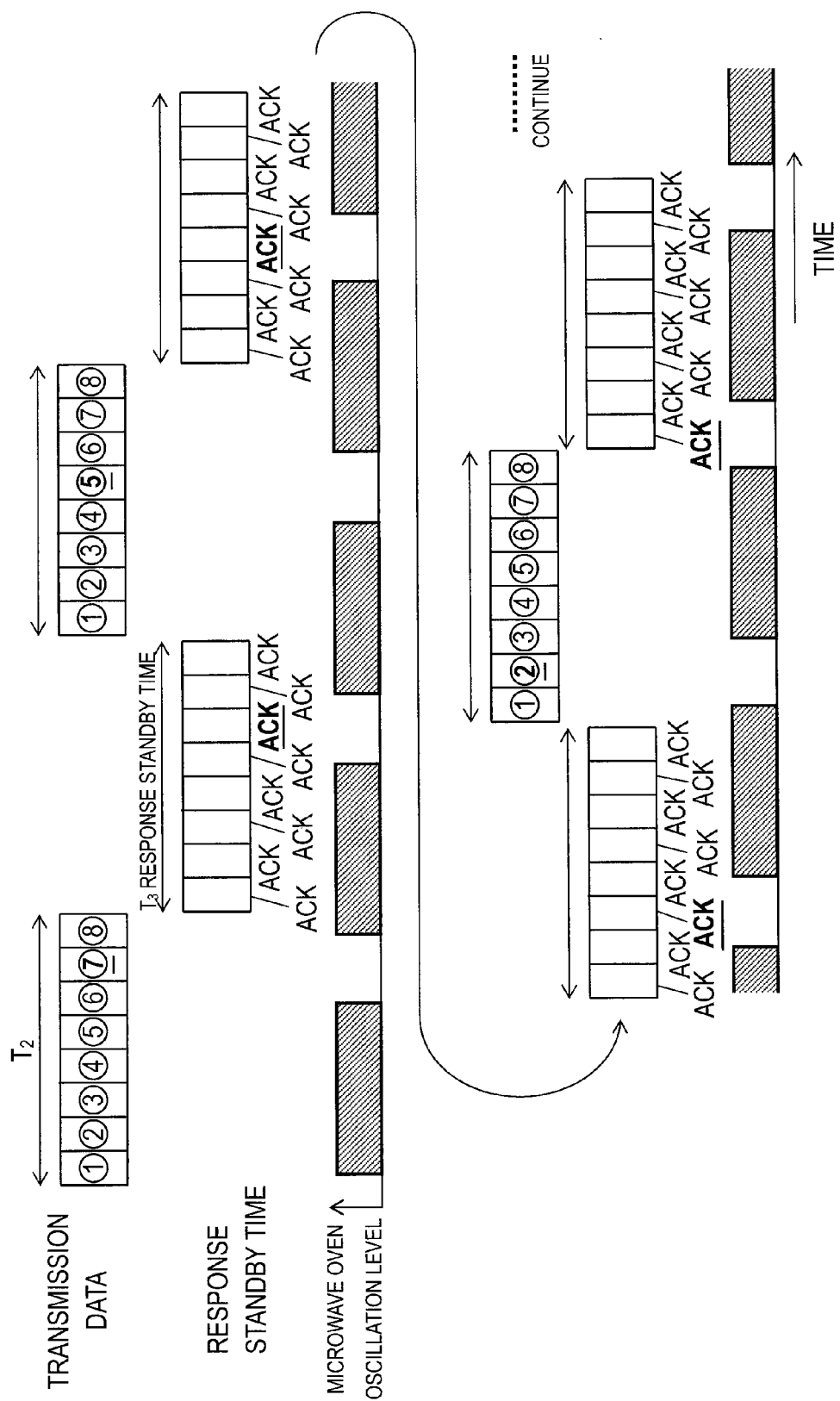
FIG. 11 is an explanatory view showing the configuration of a transmission packet of a wireless communication device in a fifth exemplary embodiment of the invention.

FIG. 11 is an explanatory view showing the configuration of a transmission packet of a wireless communication device in a fifth exemplary embodiment of the invention. In this exemplary embodiment, the time length $T_3$ of the response standby time of wireless communication device 1 satisfies the relationship $T_3 \geq T_0/2$, compared to the fourth exemplary embodiment. If $T_3$ is set in this way, the oscillation of the microwave oven is certainly stopped within the time $T_3$, it is possible to reliably receive a response packet.

A wireless communication device on the reception side transmits a response packet having a plurality of slots at the timing at which wireless communication device 1 is at the response standby time. In FIG. 11, the time length of the response packet is $T_3$.

Each slot of the response packet includes information regarding reception success/failure of a slot from wireless communication device 1 or information regarding the number of a subslot which is successfully received. Accordingly, wireless communication device 1 can know which subslot is successfully transmitted. Wireless communication device 1 can change the content of a slot to be next transmitted on the basis of this information.

For example, when the transmission of all the subslots is successful, wireless communication device 1 can stop the transmission of the next slot and can transmit the next packet. When only a specific subslot is failed, a slot in which the corresponding subslot is lined can be formed and transmitted.

Alternatively, wireless communication device 1 may perform an operation to determine the oscillation stop timing of the microwave oven on the basis of the temporal position of a subpacket which is successfully transmitted, and to form and transmit a slot such that a subslot which is failed in transmission is positioned in accordance with the oscillation stop timing.

In the example shown in FIG. 11, in the first slot, the oscillation of the microwave oven is stopped at the timing of the subslot (7). When the subslot (7) can be received with no bit errors, a response packet which includes information representing successful reception of the subslot (7) is transmitted from the wireless communication device on the reception side. In the example of FIG. 11, eight response slots (indicated by ACK) which constitute the response packet to be transmitted at the first response standby time include the same information. Wireless communication device 1 can obtain the same information even if any response slot is received.

For example, although in FIG. 11, eight response slots are continued in the first response packet, each response slot includes information representing successful reception of the subslot (7). Wireless communication device 1 can know from this information that, although the reception of a response slot is failed while the microwave oven is oscillating, a response slot which has been received in the time zone when oscillation is stopped is successfully received, specifically, the subslot (7) is successfully transmitted.

For example, when the second response packet is received and it is known that the transmission of all the subslots is successful, wireless communication device 1 stops the transmission of the next slot and completes transmission.

For example, when the second response packet is received and it is known that a subslot other than the subslot (7) is successfully transmitted, wireless communication device 1 transmits all subslots included to a slot to be next transmitted as the subslot (7). Accordingly, it is possible to increase the rate of transmission success of the subslot (7).

In FIG. 11, the sixth response slot (indicated by ACK in boldface) in the first response packet is received by wireless communication device 1 without being affected by oscillation of the microwave oven. When receiving the response packet, wireless communication device 1 recognizes that a subslot other than the subslot (7) is failed, and thus continuously transmits the next slot. This operation is repeated, and wireless communication device 1 stops slot transmission when all the subslots are successfully transmitted.

A difference between this exemplary embodiment and the fourth exemplary embodiment is that, in this exemplary embodiment, it is possible to reliably receive a response packet even in an environment in which there is a large influence of the microwave oven.

In the fourth exemplary embodiment, wireless communication device 1 may be failed in receiving a response packet. In particular, when the microwave oven is disposed near wireless communication device 1, even if reception is successful in the wireless communication device on the reception side, wireless communication device 1 may not receive a response packet, and accordingly, a slot may be unnecessarily transmitted in turn. However, according to this exemplary embodiment, the response standby time is extended until oscillation of the microwave oven is certainly stopped, it is possible to reliably receive a response packet. There is no case where an unwanted slot is transmitted.

A flowchart of the operation of wireless communication device 1 of this exemplary embodiment is the same as in FIG. 10. A difference is that the response standby time is extended.

Although in the first exemplary embodiment to the fifth exemplary embodiment, the time length $T_1$ of the subslot is expressed by $(T_0/2)/M$, the time length of the subslot is not limited thereto, and may be a predetermined time X which is shorter than the oscillator stopping time of the microwave oven oscillation level set in various ways on the basis of the period of a change in voltage of the commercial AC power supply.

INDUSTRIAL APPLICABILITY

As described above, according to the invention, it is possible to obtain a wireless communication device in which it is not necessary to perform communication aimed at the timing of the zero cross point, or it is not necessary to synchronize with the commercial power supply or to accurately recognize the operation state of the microwave oven. Therefore, it is useful for a wireless communication device which performs wireless communication by electric waves, in particular, a wireless communication device which is capable of preventing the communication distance from being reduced due to the influence of unwanted radiation from the microwave oven when communication is performed in an environment in which the microwave oven is in operation, or the like.

The invention claimed is:

1. A wireless communication device comprising:
a transmission data generator which segments transmission data into a plurality of subslots and then generates a plurality of slots, each of the plurality of slots including a predetermined number of subslots from among the plurality of subslots; and
a transmitter which transmits the plurality of slots generated by the transmission data generator,
wherein a time length $T_1$ of each of the plurality of subslots is equal to or smaller than an oscillator stopping time of an oscillator which may emit unwanted radiation to an ambient environment including the wireless communication device and interfere with wireless communication of the wireless communication device and which is determined on the basis of a change in voltage of a commercial AC power supply,
Wherein a time length $T_2$ of each of the plurality of slots is larger than the oscillator stopping time.

2. The wireless communication device of claim 1,
wherein the time length $T_2$ of each of the plurality of slots is $T_2=T_0/2$ ($T_0$: a period of the commercial AC power supply).

3. The wireless communication device of claim 1,
wherein the time length $T_2$ of each of the plurality of slots is $T_2=T_0/2+T_1$ ($T_0$: a period of the commercial AC power supply).

4. The wireless communication device of claim 1,
wherein the time length $T_2$ of each of the plurality of slots is $T_2=T_0/2-T_1$ ($T_0$: a period of the commercial AC power supply).

5. The wireless communication device of claim 1, further comprising:
a receiver which receives a response signal from an another wireless communication device,
wherein the transmission data generator provides a response standby time, for which a transmission operation is stopped, between the plurality of slots, and changes a content of a packet to be transmitted after the response standby in accordance with a content of the response signal received by the receiver for the response standby time.

6. The wireless communication device of claim 5,
wherein the response standby time is $T_3 \geq T_0/2$ ($T_3$: a length of the response standby time).

* * * * *